United States Patent [19]
Wakana et al.

[11] Patent Number: 6,033,760
[45] Date of Patent: Mar. 7, 2000

[54] MAGNETIC RECORDING MEDIUM

[75] Inventors: Shigeaki Wakana; Tadashi Ito, both of Tochigi-ken, Japan

[73] Assignee: Kao Corporation, Tokyo, Japan

[21] Appl. No.: 09/023,612

[22] Filed: Feb. 13, 1998

[51] Int. Cl.[7] .................................................. G11B 05/68
[52] U.S. Cl. .......................... 428/141; 428/323; 428/336; 428/694 BS; 428/694 BR; 428/900
[58] Field of Search .................... 428/141, 323, 428/336, 694 BS, 694 BR, 900

[56] References Cited

U.S. PATENT DOCUMENTS 5,202,810  4/1993  Nakamura et al. ...................... 360/135
5,340,635  8/1994  Isobe et al. .............................. 428/141

FOREIGN PATENT DOCUMENTS 4-157616  5/1992  Japan .
5-298658  11/1993  Japan .

*Primary Examiner*—Stevan A. Resan
*Attorney, Agent, or Firm*—Oblon, Spivak, McClelland, Maier & Neustadt, P.C.

[57] ABSTRACT

A magnetic recording medium having a nonmagnetic substrate, an intermediate layer containing at least a nonmagnetic powder, and a magnetic layer containing a ferromagnetic powder and a binder, wherein the magnetic layer has an indentation hardness of 0.3 GPa or more, and the surface profile of the magnetic layer satisfies the following conditions (a) to (c): (a) the 10 point height parameter $R_Z$ is 100 nm or less; (b) the difference between the maximum peak-to-valley distance PV and $R_Z$ ($PV-R_Z$) is 10 nm or less; and (c) the skewness Rsk is −2 or more and less than 0, has excellent electromagnetic conversion characteristics and running durability.

18 Claims, 2 Drawing Sheets

MAGNETIC RECORDING MEDIUM

BACKGROUND OF THE INVENTION

1 Field of the Invention

The present invention relates to a magnetic recording medium such as a magnetic tape and a magnetic disk. More particularly, the present invention relates to a magnetic recording medium for high-density recording which causes few dropouts and has excellent electromagnetic conversion characteristics and excellent running durability.

2. Description of the Related Art

A variety of magnetic recording media, such as magnetic tapes (e.g., a video tape) and magnetic disks for computer memories, have been in use. The demand for high performance of these magnetic recording media, particularly the demand for recording density and running durability has been increasing from year to year.

An increase of recording density is achieved by, for example, smoothing the surface of a magnetic recording medium or a magnetic head so as to reduce the spacing loss between the medium and the head. On the other hand, many proposals have been made to date on improvement of durability. For example, Japanese Patent Laid-Open No. 4-157616 proposes adding to a magnetic layer a combination of a relatively hard organic solid additive and a relatively soft organic solid additive.

It has been difficult, however, to fully satisfy both the recently increasing recording density and durability requirements. For example, an attempt to increase recording density by smoothing the surface of the recording medium as much as possible results in an increase of contact area with a magnetic head, which will cause sticking of the medium to the magnetic head. It tends to follow that the magnetic layer is peeled, causing dropouts. Application of the above-mentioned proposal is still insufficient for solving this problem.

Conventional techniques relating to the hardness of layers constituting a magnetic recording medium include the one disclosed in Japanese Patent Laid-Open No. 5-298658. Aiming at improving the contact with a magnetic head thereby to minimize the spacing loss, the publication specifies that the Vickers hardness of the uppermost magnetic layer is not lower than 40 and lower than 200 and is higher than that of the lower layer by 5 or more. However, because attention is paid only to the hardness of the layers, the magnetic layer is liable to peel due to the above-described sticking to a magnetic head. Further, reduction in error rate is insufficient.

SUMMARY OF THE INVENTION

An object of the present invention is to provide a magnetic recording medium which enables high-density recording, causes few dropouts, and exhibits excellent electromagnetic conversion characteristics and running durability.

In order to accomplish the above object, the inventors of the present invention have conducted extensive investigations, and as a result, it has now been found that a magnetic recording medium having a high output, reduced dropout and a reduced error rate can be obtained by specifying the indentation hardness of the magnetic layer within a specific range and reducing the surface roughness of the magnetic layer while specifying the symmetry of the surface profile of the magnetic layer, i.e., skewness, within a specific range.

The present invention includes a magnetic recording medium comprising (i) a nonmagnetic substrate, (ii) an intermediate layer containing at least a nonmagnetic powder and located on said substrate, and (iii) a magnetic layer containing a ferromagnetic powder and a binder and located on said intermediate layer, said magnetic layer having an indentation hardness of 0.3 GPa or more, and the surface profile of said magnetic layer satisfying the following conditions (a) to (c):

(a) the 10 point height parameter $R_z$ is 100 nm or less;

(b) the difference between the maximum peak-to-valley distance PV and $R_z$ ($PV-R_z$) is 10 nm or less; and (c) the skewness Rsk is −2 or more and less than 0.

The magnetic recording medium according to the present invention is excellent in electromagnetic conversion characteristics, highly durable in continuous running, and less causative of wear to a magnetic head. Further, the magnetic recording medium of the present invention has reduced dropout and a reduced error rate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE INVENTION

Figure 1:
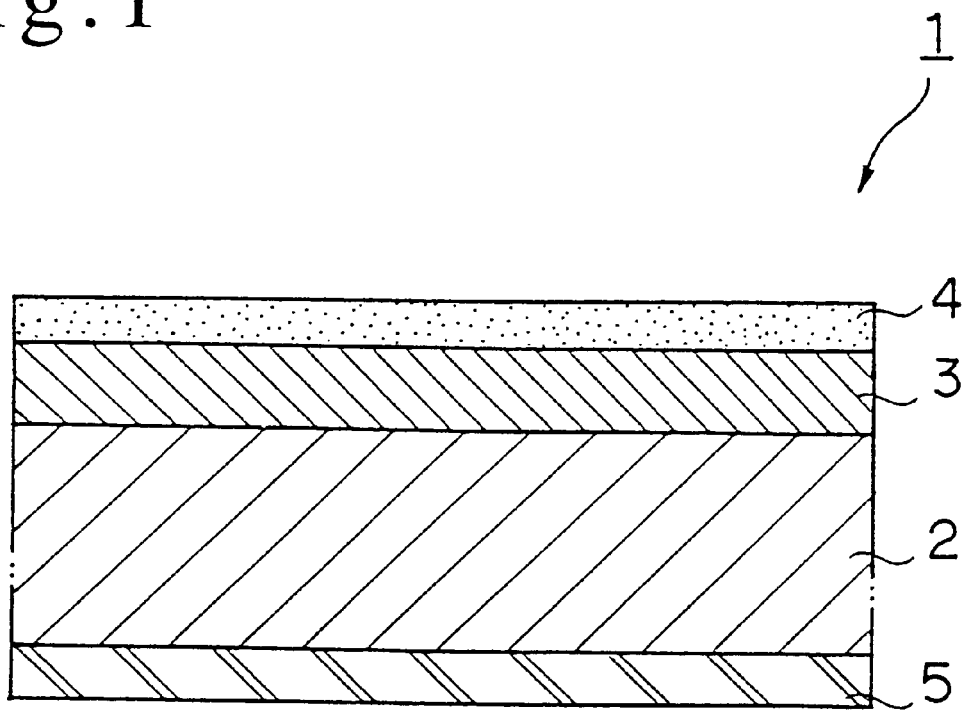
FIG. 1 is a schematic cross section showing a preferred structure of the magnetic recording medium according to the present invention.

In FIG. 1 is shown schematically a preferred structure of the magnetic recording medium according to the present invention. The magnetic recording medium 1 shown in FIG. 1 comprises a nonmagnetic substrate 2, an intermediate layer 3 located on the surface side of the nonmagnetic substrate 2, a magnetic layer 4 located on the intermediate layer 3 as a top layer, and a backcoating layer 5 provided on the back side of the nonmagnetic substrate 2. The magnetic layer 4 contains a ferromagnetic powder and a binder.

The nonmagnetic substrate 2 to be used in the present invention is not particularly limited, and any known nonmagnetic substrate can be used. Suitable nonmagnetic substrates include flexible films and disks made of a polymer, and films, disks and cards made of nonmagnetic metals, e.g., Cu, Al or Zn, glass or ceramics such as porcelain and pottery.

The polymer used for forming flexible films or disks includes polyesters such as polyethylene terephthalate, polybutylene terephthalate, polyethylene naphthalate, polycyclohexylene dimethyleneterephthalate and polyethylene bisphenoxycarboxylate; polyolefins such as polyethylene and polypropylene; cellulose derivatives such as cellulose acetate and cellulose acetate propionate; vinyl resins such as polyvinyl chloride and polyvinylidene chloride; polyamide; polyimide; polycarbonate; polysulfone; polyether ether ketone; and polyurethane. Films made up of two or more kinds of these polymers can be used. The thickness of the substrate 2 is not particularly limited, usually ranging from 2 to 100 μm, preferably 2 to 76 μm.

The backcoating layer 5, which is provided on the back side of the nonmagnetic substrate 2 if necessary, can be formed by using any known backcoating composition with no particular limitation.

The magnetic layer 4 is usually provided as a top layer of the magnetic recording medium 1, i.e., the magnetic layer is present on the surface of the magnetic recording medium 1. This layer may be formed by using a magnetic coating composition comprising a ferromagnetic powder, a binder and a solvent.

The ferromagnetic powder may be a ferromagnetic metal powder predominantly comprising iron; a ferromagnetic iron oxide powder such as $\gamma$-$Fe_2O_3$ and/or Co-coated $\gamma$-$Fe_2O_3$; and/or a ferromagnetic hexagonal ferrite powder. The ferromagnetic metal powder may be those having a metal content of 70% or more by weight, 60% or more by weight of which is Fe. Specific examples of the ferromagnetic metal powder include Fe powder and powder of an Fe alloy, e.g., Fe—Co, Fe—Ni, Fe—Al, Fe—Ni—Al, Fe—Co—Ni, Fe—Ni—Al—Zn and/or Fe—Al—Si. The ferromagnetic metal powder and ferromagnetic iron oxide powder preferably have an acicular shape or a spindle shape, with the major axis preferably having a length of 0.05 to 0.25 μm, still more preferably 0.05 to 0.2 μm, its acicular ratio being preferably 3 to 20, its X—ray particle diameter being preferably 130 to 250Å, and its BET specific surface area preferably ranging from 30 to 60m²/g.

The ferromagnetic hexagonal ferrite powder includes fine tabular particles of barium ferrite, or strontium ferrite, and those particles with the Fe atoms thereof partially replaced with atoms of Ti, Co, Ni, Zn, V or the like. The ferromagnetic hexagonal ferrite powder preferably has a tabular diameter of 0.02 to 0.09 μm, a tabular ratio of 2 to 7, and a BET specific surface area of 30 to 60 m²/g.

The coercive force of each of the ferromagnetic powders is preferably 1,500 to 2,500 Oe, still more preferably 1,600 to 2,400 Oe. Within this range, sufficient RF output over the entire wavelength region can be obtained, and satisfactory overwrite characteristics can be exhibited. The saturation magnetization of the ferromagnetic iron oxide powder and ferromagnetic metal powder preferably ranges from 100 to 180 emu/g, still more preferably 110 to 160 emu/g. The saturation magnetization of the ferromagnetic hexagonal ferrite powder preferably ranges from 30 to 70 emu/g, still more preferably 45 to 70 emu/g. Within these ranges, sufficient reproduction outputs are obtained. Particularly preferred ferromagnetic powder is an acicular ferromagnetic metal powder or iron oxide powder having a longer axis length of 0.05 to 0.25 μm and an acicular ratio of 3 to 20. If desired, the ferromagnetic powder to be used may contain rare earth elements or transition metal elements.

The binder which may be used in the magnetic coating composition forming the magnetic layer 4 includes thermoplastic resins, thermosetting resins and reactive resins, either individually or as a mixture thereof. Examples of suitable binders are vinyl chloride resins, polyester, polyurethane, nitrocellulose and epoxy resins. In addition, the resins described in Japanese Patent Laid-Open No. 57-162128, page 2, upper right column, line 19 to lower right column, line 19, which is incorporated herein by reference, may be also employable. These binders can contain a polar group for improving dispersibility. The binder can be preferably used in an amount of from 5 to 200 parts by weight, more preferably from 5 to 70 parts by weight, per 100 parts by weight of the ferromagnetic powder.

The solvent which can be used in the magnetic coating composition for providing the magnetic layer 4 includes ketones, esters, ethers, aromatic hydrocarbons and chlorinated hydrocarbons. Specific examples of the solvents are given in Japanese Patent Laid-Open No. 57-162128, page, 3, lower right column, line 17 to page 4, lower left column, line 10, incorporated herein by reference. The solvent may be preferably used in an amount of 80 to 500 parts by weight, still more preferably 100 to 350 parts by weight, per 100 parts by weight of the magnetic powder.

If desired, the magnetic coating composition used for the formation of the magnetic layer 4 may contain additives generally used in magnetic recording media. Examples of the additives include dispersants, lubricants, abrasive particles, antistatics, rust inhibitors, antifungals and fungistats. Specific examples of the additives are described in Japanese Patent Laid-Open No. 57-162128, page 2, lower left column, line 6 to lower right column, line 10 and page 3, lower left column, line 6 to lower right column, line 18, incorporated herein by reference. The magnetic layer 4 preferably has a thickness of 0.05 to 1 μm, still more preferably 0.05 to 0.3 μm. Within this range, the output and durability are satisfactory.

The intermediate layer 3 may be either magnetic or nonmagnetic. Where the intermediate layer 3 is magnetic, the intermediate layer 3 contains a magnetic powder and is formed by using a coating composition comprising the magnetic powder, a nonmagnetic powder, a binder and a solvent. Where the intermediate layer 3 is nonmagnetic, the intermediate layer 3 contains a nonmagnetic powder and is formed by using a coating composition comprising the nonmagnetic powder, a binder and a solvent. These coating compositions will hereinafter be inclusively referred to as intermediate layer coating compositions.

The magnetic powder used in the intermediate layer coating composition preferably includes ferromagnetic powder. Either soft magnetic powder or hard magnetic powder may be used as the ferromagnetic powder. While the soft magnetic powder to be used is not particularly limited in kind, soft magnetic materials used in light electric appliances, such as a magnetic head or an electronic circuit, are preferred. For example, the soft magnetic materials described in Tikazumi Toshinobu, *Kyojiseitai no Buturi* (2nd Vol.), "*Jikitokusei to Ohyo*", pp. 368–376, Shokabo (1984), incorporated herein by reference, may be used. Soft magnetic oxide powder may be mentioned as a specific example. On the other hand, the hard magnetic powder includes ferromagnetic metal powder predominantly comprising iron, ferromagnetic iron oxide powder and/or ferromagnetic hexagonal ferrite powder. Examples of the ferromagnetic powder used in the magnetic layer 4 may be used as the hard magnetic powder for use in the magnetic intermediate layer 3. The physical properties, such as coercive force, saturation magnetization, shape, specific surface area, etc., of the ferromagnetic powder used in the magnetic layer 4 also apply to the hard magnetic powder for use in the magnetic intermediate layer 3. If desired, the magnetic powder contained in the intermediate layer 3 may contain rare earth elements or transition metal elements. The same surface treatments as could be given to the ferromagnetic powder of the magnetic layer 4 can also be applied to the magnetic powder of the intermediate layer 3.

The binder and solvent which may be used in the intermediate layer coating composition may be selected from those usable in the magnetic coating composition for the magnetic layer 4. The binder is preferably used in an amount of 5 to 200 parts by weight, still more preferably 5 to 70 parts by weight, per 100 parts by weight of the total amount of the magnetic powder and nonmagnetic powder (where the intermediate layer 3 is magnetic) or per 100 parts by weight of the nonmagnetic powder (where the intermediate layer 3 is nonmagnetic). The solvent is preferably used in an amount of 80 to 500 parts by weight, still more preferably 100 to 350 parts by weight, per 100 parts by weight of the total amount of the magnetic powder and nonmagnetic powder (where the intermediate layer 3 is magnetic) or per 100 parts by weight of the nonmagnetic powder (where the intermediate layer 3 is nonmagnetic). If desired, the intermediate layer may contain various additives usable in the magnetic layer 4.

The nonmagnetic powder which may be used in the intermediate layer 3 includes powders of carbon black, graphite, titanium oxide, barium sulfate, zinc sulfide, magnesium carbonate, calcium carbonate, zinc oxide, silicon dioxide, nonmagnetic chromium oxide, alumina, silicon carbide, nonmagnetic iron oxide, silicon nitride and resins. In particular, nonmagnetic iron oxide, titanium oxide, carbon black, alumina and silicon dioxide are preferred. These nonmagnetic powders may be used either individually or as a combination of two or more thereof. Where the intermediate layer 3 contains both the nonmagnetic powder and magnetic powder, a preferred nonmagnetic powder to magnetic powder ratio is preferably 99:1 to 10: 90, still more preferably 90:10 to 20:80, by weight.

The nonmagnetic powders may have any one of a spherical shape, a tabular shape, and an acicular shape, or may be amorphous. Spherical, tabular, and amorphous nonmagnetic powders preferably have a particle size of 5 to 1,000 nm, and acicular particles preferably have a major axis length of 0.02 to 0.3 µm, particularly 0.02 to 0.08 µm, with an acicular ratio of 3 to 20. Particularly preferred nonmagnetic powder is acicular nonmagnetic powder, for example, α-iron oxide powder, having a longer axis length of 0.02 to 0.3 µm and an acicular ratio of 3 to 20. For the purpose of improving dispersibility of the nonmagnetic powder, the nonmagnetic powder may be subjected to the same surface treatment as could be given to the ferromagnetic powder for use in the magnetic layer 4.

The solvent may be selected from those usable in the magnetic coating composition for the formation of the magnetic layer 4. The solvent is preferably used in an amount of 80 to 500 parts by weight, still more preferably 100 to 350 parts by weight, per 100 parts by weight of the total amount of the magnetic powder and nonmagnetic powder (where the intermediate layer 3 is magnetic) or per 100 parts by weight of the nonmagnetic powder (where the intermediate layer 3 is nonmagnetic).

The intermediate layer 3 preferably has a thickness of 0.1 to 2.5 µm, particularly 0.2 to 2.0 µm, especially 0.2 to 1.5 µm. The magnetic recording medium can have sufficient bending stiffness with the intermediate layer 3 having a thickness within this range. The magnetic recording medium 1 shown in FIG. 1 preferably has a total thickness of 2 to 15 µm, particularly 2 to 12 µm, for securing suitability to high-density recording.

In the magnetic recording medium of the present invention, the magnetic layer 4 has such a surface profile as satisfies the following conditions (a) to (c) when measured with a laser interference type profilometer:

(a) The 10 point height parameter $R_Z$ is 100 nm or less;

(b) The difference between the maximum peak-to-valley distance PV and $R_Z$ (PV–$R_Z$) is 10 nm or less; and (c) The skewness Rsk is –2 or more and less than 0.

Condition (a) in which the 10 point height parameter $R_Z$ is 100 nm or less assures the smoothness of the surface of the magnetic layer 4, making high-density recording feasible. For high-density recording, the 10 point height parameter $R_Z$ is preferably 70 nm or less. The lower limit of the 10 point height parameter $R_Z$ is usually about 20 nm. At an $R_Z$ lower than this value, the magnetic recording medium may tend to have poor durability. The 10 point height parameter $R_Z$ is defined in JIS B0601-1994 and can be determined with a laser interference type profilometer. In the present invention, the 10 point height parameter $R_Z$ was measured with a profilometer Maxim 3D Model 5700 manufactured by ZYGO under the following conditions.

| Measuring Conditions: | |
| --- | --- |
| Lens | :Fizeau 40x |
| Remove | :Cylinder |
| Trim | :0 |
| Filter | :off |

Condition (b) that the difference between the maximum peak-to-valley distance PV and the $R_Z$ (PV–$R_Z$) is 10 nm or less, means that the peaks on the surface of the magnetic layer 4 are regular in height. Condition (b), united with conditions (a) and (c), also implies that there are few large and sharp peaks on the surface of the magnetic layer. As a result, with the surface smoothness of the magnetic layer being assured by condition (a), occurrence of dropouts due to fall-off of the peaks during running is suppressed, and occurrence of errors during long-term running is reduced. With the value (PV–$R_Z$) being 8 nm or less, better performance results can be achieved. The absolute value of PV per se is not particularly limited provided that the value (PV–$R_Z$) is 10 nm or less. The value PV is preferably 20 to 100 nm, still more preferably 30 to 90 nm. If the value PV is too large, occurrence of errors may increase due to the spacing loss. On the other hand, if the value PV is to small, durability of the medium may be deteriorated.

The skewness Rsk as specified by condition (c) is the measure of the symmetry of the surface profile about the mean line of a roughness assessment obtained with the above-described profilometer. Skewness is calculated from equation (1) below:

$$Rsk = \frac{1}{n(Rq)^3} \sum_{i=1}^{i=n} (y_i)^3 \quad (1)$$

wherein yi represents the distance from the mean line to the peak (positive value) or valley (negative value); Rq represents a root-mean-square (rms) roughness; and n represents the number of data points. To have an Rsk of –2 or more and less than 0 means that the surface has few sharp and high peaks. When combined with conditions (a) and (b), condition (c) also indicates that the magnetic layer 4 has on its surface small peaks regular in height with few large and sharp peaks. As a result, with the surface smoothness of the magnetic layer being assured by condition (a), occurrence of dropouts due to fall-off of the peaks during running is suppressed, and occurrence of errors during long-term running is suppressed. With the Rsk ranging from –1.2 to –0.2, better performance results can be achieved.

The surface profile of the magnetic layer 4 of the magnetic recording medium of the present invention may be controlled so as to satisfy the above-mentioned conditions (a) to (c) by, for example, (i) a method optimizing the powders to be used in the magnetic layer and the intermediate layer, (ii)

a method optimizing the roll surface temperature and the roll linear pressure in calendering (for example, the roll surface temperature is set at 80 to 200° C., particularly 80 to 120° C., and the roll linear pressure is set between 150 and 500 kgf/cm, particularly 200 to 400 kgf/cm), (iii) a method including polishing the magnetic layer under specific conditions (for example, using an abrasive having a Knoop hardness number of 2,500 or more, or the magnetic recording medium is polished under a tension load of 200 g/inch or more, particularly 220 g/inch or more, applied in the planar direction), (iv) a method including transferring the surface profile of the backcoating layer to the magnetic layer while the magnetic recording medium is aged, or (v) a combination of two or more of these methods.

Figure 2:
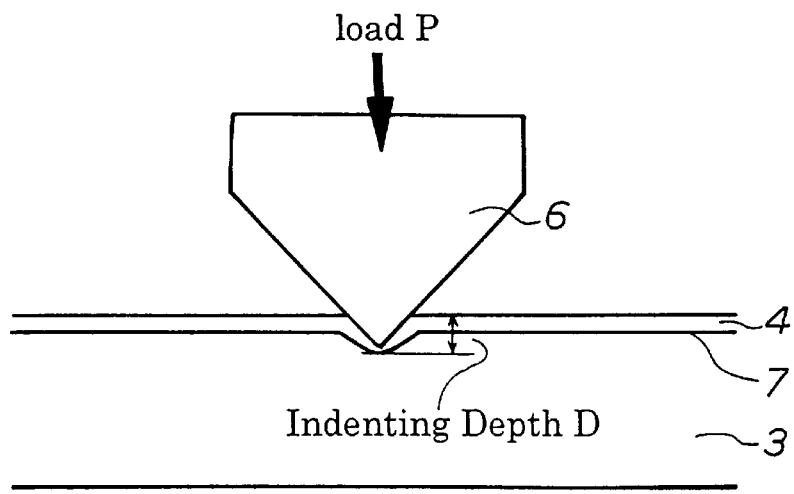
FIG. 2 is a schematic cross section showing the indentation test, in which the indenter foot of a thin film hardness tester is indenting a magnetic layer and an intermediate layer.

The magnetic layer 4 should have an indentation hardness of 0.3 GPa or more. For obtaining more satisfactory output stability, the indentation hardness of the magnetic layer 4 is preferably 0.3 to 2.5 GPa. The terminology "indentation hardness" as used herein is defined to be a hardness value as measured in the following manner:

(1) The indenter of a thin film hardness tester is vertically pressed into the surface of a magnetic layer at a given indenting rate, and the indenting load P (mN) applied to the indenter and the indenting depth D ($\mu$m) are recorded continuously. In FIG. 2 is illustrated the manner in which the indenter foot indents the magnetic layer 4 reaches the area of the intermediate layer 3 across the border between the two layers under indenting load P.

Figure 3:
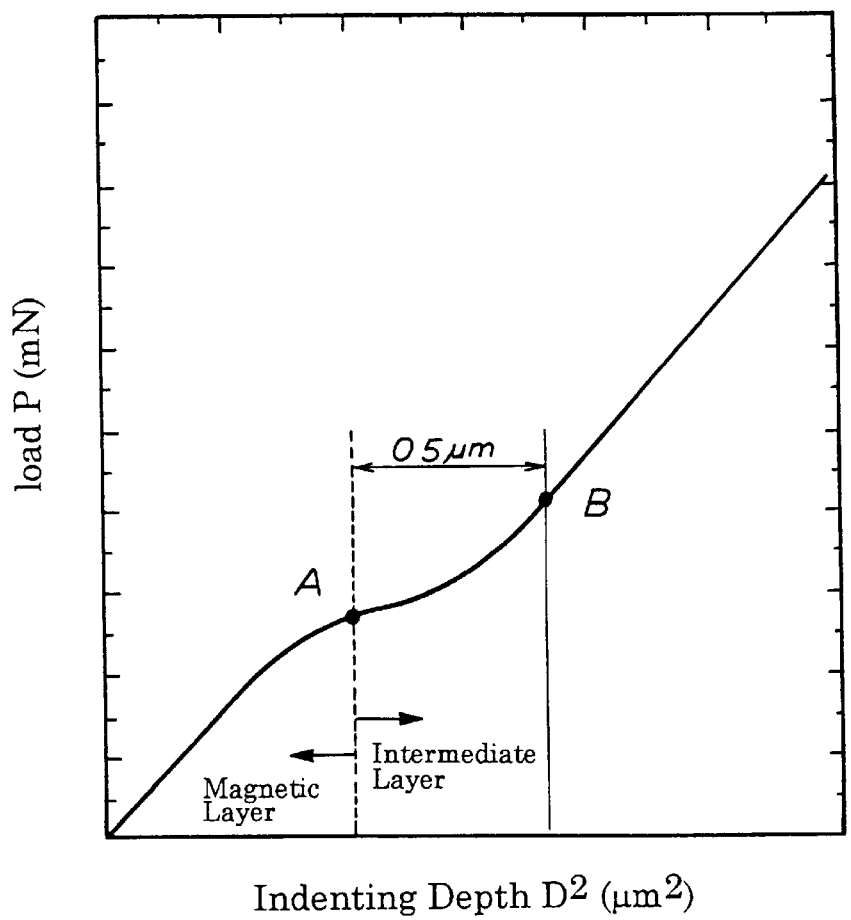
FIG. 3 is a graph showing an example of the depth D vs. the load P curve in an indentation test, with $D^2$ plotted on the x axis, and P on the y axis.

(2) A curve is depicted based on the data obtained in (1) above with $D^2$ on the x axis and P on the y axis. The average slope of the curve from the surface of the magnetic layer 4 up to the border between the layers ($k_1$) and the average slope of the curve from the border up to a depth of 0.5 $\mu$m in the intermediate layer 3 ($k_2$) are obtained by the least squares method. FIG. 3 schematically shows the method for obtaining the average slopes $k_1$ and $k_2$. In the curve of FIG. 3, $k_1$ is the average slope of the $D^2$ vs. P curve between the starting point O and the border 7 between the layers, and $k_2$ is the average slope of the $D^2$ vs. P curve between the border 7 and a depth of 0.5 $\mu$m in the intermediate layer 3.

(3) From the thus obtained $k_1$ and $k_2$ are calculated the indentation hardness $H_1$ of the magnetic layer 4 and $H_2$ of the intermediate layer 3 according to equations:

$$H_1[GPa]=\alpha \cdot k_1$$

$$H_2[GPa]=\alpha \cdot k_2$$

wherein $\alpha$ is a constant intrinsic to an indenter, used for proper corrections on the measurements. The thin film hardness tester used in the practice of the present invention is HMA-400 manufactured by NEC Corp., the indenter of which is a triangle pyramid having an angle of opposite faces of 80° and a foot radius of 100 nm. The indenting rate was set at 10.5 nm/sec.

If the magnetic layer 4 has an indentation hardness of less than 0.3 GPa, the magnetic recording medium, if designed for high-density recording, will fail to have stable outputs due to shortage of stiffness in the indentation direction (i.e., the direction perpendicular to the surface of the magnetic recording medium). If the indentation hardness of the magnetic layer 4 is excessively high, considerable wear of a magnetic head in contact with the magnetic recording medium can result. It is preferred for further improvement in output stability and greater protection of a magnetic head from wear that the indentation hardness of the magnetic layer 4 be from 0.3 to 2.5 GPa, particularly from 0.4 to 2.5 GPa, especially from 0.5 to 2.0 GPa.

It is preferred that the indentation hardness of the intermediate layer 3 fall within a range of 50% to 200% of that of the magnetic layer 4. If it is less than 50%, it follows that the intermediate layer yields to pressure applied by a magnetic head through the magnetic layer 4 on recording and reproduction. As a result, the magnetic layer 4, which has a relatively high hardness, suffers from local distortion and is likely to break. If the indentation hardness of the intermediate layer 3 exceeds 200% of that of the magnetic layer 4, the pressing force of the magnetic head through the magnetic layer 4 is hardly buffered by the intermediate layer 3. It also follows that the magnetic layer 4 suffers from local distortion and is likely to break. In addition, the magnetic head and the magnetic recording medium are rubbed hard together so that the coating of the medium is apt to stick to the magnetic head, contaminating the head. More satisfactory electromagnetic conversion characteristics can result when the indentation hardness of the intermediate layer 3 is 70 to 150%, particularly 80 to 120%, of that of the magnetic layer 4. The indentation hardness of the intermediate layer 3 per se is not particularly limited as far as the above-mentioned relationship to the indentation hardness of the magnetic layer 4 is satisfied. It is preferably 0.3 to 3.0 GPa, still more preferably 0.4 to 2.5 GPa.

An illustrative example of a process for producing the magnetic recording medium shown in FIG. 1 will be described in brief. An intermediate layer coating composition forming an intermediate layer 3 and a magnetic coating composition forming a magnetic layer 4 are applied to a nonmagnetic substrate 2 by simultaneous coating in a wet-on-wet coating system to form an intermediate layer 3 and a magnetic layer 4 having the respective desired dry thicknesses. The simultaneous coating may be carried out in accordance with the method described in Japanese Patent Laid-Open No. 5-73883, column 42, line 31 to column 43, line 31, incorporated herein by reference. The coated layers are then subjected to an orientation treatment in a magnetic field, dried, and calendered. A backcoating composition is applied to the back side of the substrate to provide a backcoating layer 5, followed by drying. After aging, the thus obtained stock web is slit to desired width for the production of a magnetic tape.

The orientation treatment in a magnetic field may be performed before the intermediate layer coating composition and the magnetic coating composition dry. In the production of a magnetic tape, for instance, the orientation treatment may be carried out by applying a magnetic field of about 500 Oe or higher, preferably 1,000 to 10,000 Oe, in parallel with the coated side or passing the coated film through a solenoid type magnet of 1,000 to 10,000 Oe while the intermediate layer coating composition and the magnetic coating composition are wet.

The calendering of the coated layer is carried out by, for example, supercalendering comprising passing the coated film between two rolls, such as a combination of a metal roll and a cotton roll or a synthetic resin roll, or a combination of two metal rolls. The drying of the coated layers is conducted by, for example, supplying gas heated to 30 to 120° C. The degree of drying may be controlled by adjusting the temperature and the feed rate of the gas.

The indentation hardness of the magnetic layer and the intermediate layer may be adjusted within the above-described preferred ranges by (i) a method in which aging after formation of a backcoating layer is carried out at a temperature of 50 to 90° C. and a relative humidity (RH) of 15% or higher for at least 24 hours. The practical aging time is within 200 hours taking the productivity into consideration. (ii) A method in which calendering is carried out at a roll linear pressure of 250 to 500 kgf/cm and a roll surface temperature of 60 to 140° C. while controlling the variation of the roll surface temperature within ±10° C. Or (iii) a combination of the methods (i) and (ii).

In order to impart the respective intended indentation hardnesses to the two layers, whichever method (i) and (ii) may be adopted, various conditions for effecting the method chosen should be decided according to the kinds and proportions of the magnetic powder, nonmagnetic powder, binder, and additives contained in the respective coating compositions and other factors. These conditions may easily be determined through preliminary experimentation.

The magnetic recording medium can have additional layers. Specifically, an adhesive layer may be provided between the nonmagnetic substrate 2 and the intermediate layer 3, or an additional magnetic layer for recording servo signals in order to cope with hardware systems using long wavelength signals or additional nonmagnetic layer may be provided between the nonmagnetic substrate 2 and the intermediate layer 3 or between the intermediate layer 3 and the magnetic layer 4.

Having generally described this invention, a further understanding can be obtained by reference to certain examples which are provided herein for purposes of illustration only and are not intended to be limiting unless otherwise specified. Unless otherwise noted, all the parts and percents are given by weight.

EXAMPLE 1

The following components were mixed and dispersed thereby to prepare an intermediate layer coating composition, a magnetic coating composition and a backcoating composition, respectively.

| Formulation of Intermediate Layer Coating Composition | |
|---|---|
| Nonmagnetic powder (acicular α-iron oxide powder; major axis length: 0.18 μm; acicular ratio: 6) | 100 parts |
| Abrasive (alumina; average particle size: 0.2 μm) | 7 parts |
| Antistatic agent (carbon black; average primary particle size: 20 nm) | 2 parts |
| Binders: | |
| Sulfonate-containing vinyl chloride copolymer resin | 11 parts |
| Sulfonate-containing polyurethane resin | 13 parts |
| Lubricants: | |
| Stearic acid | 2 parts |
| Butyl oleate | 2 parts |
| Hardener: Isocyanate hardener | 4 parts |
| Solvent (mixture of methyl ethyl ketone/ toluene/cyclohexanone = 1/1/1 by weight) | 300 parts |

| Formulation Magnetic Coating Composition: | |
|---|---|
| Ferromagnetic metal powder predominantly comprising iron (coercive force: 1,850 Oe; saturation magnetization: 130 emu/g; major axis length: 0.10 μm; acicular ratio: 8) | 100 parts |
| Abrasive (alumina; average particle size: 0.2 μm) | 14 parts |
| Antistatic agent (carbon black; average primary particle size: 0.02 μm) | 1 part |

| Formulation Magnetic Coating Composition: -continued | |
|---|---|
| Binders: | |
| Sulfonate-containing vinyl chloride copolymer resin | 11 parts |
| Sulfonate-containing polyurethane resin | 23 parts |
| Lubricants: | |
| Stearic acid | 4 parts |
| Butyl oleate | 2 parts |
| Hardener: Isocyanate hardener | 4 parts |
| Solvent (mixture of methyl ethyl ketone/ toluene/cyclohexanone = 1:1:1 by weight) | 300 parts |

| Formulation of Backcoating Composition: | |
|---|---|
| Carbon black (average primary particle size: 17 nm) | 40 parts |
| Binders: | |
| NIPPOLAN 2301 (polyurethane, by Nippon Polyurethane Industry Co., Ltd.) | 20 parts |
| Nitrocellulose | 20 parts |
| Hardener: Polyisocyanate | 20 parts |
| Solvent (mixture of methyl ethyl ketone/ toluene/cyclohexanone = 1/1/1 by weight) | 300 parts |

The magnetic coating composition and the intermediate layer coating composition were simultaneously applied to a 6 μm thick PET film at a line speed of 100 m/min, to form a surface layer composed of a magnetic layer and an intermediate layer with a dry thickness (after calendering) of 0.2 μm and 1.3 μm, respectively. While wet, the coated layers were subjected to magnetic field orientation by passing through a solenoid type magnet of 5000 Oe, and dried for 30 seconds in a drier where hot air of 90° C. was fed at a speed of 15 m/sec, and taken up. After conducting a dust removing treatment and an antistatic treatment, the coated film was subjected to calendering (mirror finish) so as to give a prescribed surface profile (preferably a center-line surface roughness Ra of 6 nm or smaller). Calendering was carried out with a supercalender at a line speed of 100 m/min, a roll linear pressure of 350 kgf/cm, and a roll surface temperature of 90° C. The opposite side of the PET film was then coated with the backcoating composition to a dry thickness of 0.5 μm, dried at 90° C. to form a backcoating layer as a back layer, and taken up. Immediately thereafter, the coated film was slit into a 8 mm wide strip which is called "Pancake", and the surface and back layers were cleaned with nonwoven cloth to obtain a magnetic recording tape. The surface of the tape was polished with a sapphire blade (Knoop hardness number: 2600) under a tension load of 400 g/inch. 120 meters of the resulting tape was put into a cassette case to prepare a 8 mm-Tape cassette for evaluation. The above coating and calendering were carried out on the same line (in-line system).

The output, and dropout of the resulting magnetic tape were measured in accordance with the following methods. The results obtained are shown in Tables 1 and 2 below.

Method of Measurement

1) Output (recording frequency=1 MHz, 7 MHz)

The magnetic tape was put in a tape cassette. Signals having a recording frequency of 1 MHz and 7 MHz were recorded respectively on the cassette tape at ambient temperature (23° C.) on a Hi-8 drive. The output on reproduction of the recorded signals (reproduction output) was measured. As a reference, the magnetic tape of Comparative Example 1 hereinafter described was recorded in the same manner. The results obtained above were expressed relatively taking the output of the reference tape of Hi-8 as a standard (100%).

2) Dropout

Dropout was measured by a commercially available Hi-8 VTR drive, which had been modified to be able to record and reproduce RF signal. Recorded signal was 100% white signal. Output reduction which was −16 dB, 10 μsec below the average output was measured as dropout.

EXAMPLE 2

A magnetic tape was prepared in the same manner as in Example 1, except that the polishing was carried out under a tension load of 300 g/inch.

EXAMPLE 3

A magnetic tape was prepared in the same manner as in Example 2, except that the calendering was carried out at a roll surface temperature of 80° C.

EXAMPLE 4

A magnetic tape was prepared in the same manner as in Example 2, except for replacing the sapphire blade used for polishing with abrasive tape WA6000.

Comparative Example 1

A magnetic tape was prepared in the same manner as in Example 1, except that the calendering was conducted at a roll linear pressure of 600 kgf/cm and the polishing was carried out under a tension load of 100 g/inch.

Comparative Example 2

A magnetic tape was prepared in the same manner as in Example 1, except for reducing the aging time for complete hardening to 20 hours and changing the tension load in the polishing to 100 g/inch.

Comparative Example 3

A magnetic tape was prepared in the same manner as in Example 1, except changing the roll linear pressure and roll surface temperature in the calendering to 200 kgf/cm and 45° C., respectively.

Comparative Example 4

A magnetic tape was prepared in the same manner as in Example 3, except for replacing the sapphire blade used for polishing with abrasive tape WA10,000.

The results of Examples 2 to 4 and Comparative Examples 1 to 4 are shown in Tables 1 and 2 together with the results of Example 1.

TABLE 1

| | Surface Characteristics of Magnetic Layer | | | | | |
|---|---|---|---|---|---|---|
| | PV | $R_z$ | PV-$R_z$ | | Output (%) | |
| | (nm) | (nm) | (nm) | Rsk | 1 MHz | 7 MHz |
| Example 1 | 68 | 64 | 4 | −0.78 | 108 | 132 |
| Example 2 | 75 | 65 | 10 | −0.13 | 110 | 120 |
| Example 3 | 82 | 74 | 8 | −0.28 | 110 | 110 |
| Example 4 | 102 | 96 | 6 | −0.08 | 100 | 105 |
| Compara. Example 1 | 77 | 65 | 12 | −0.82 | 100 | 100 |
| Compara. Example 2 | 102 | 88 | 14 | +0.26 | 90 | 90 |
| Compara. Example 3 | 110 | 162 | 8 | −0.56 | 90 | 81 |
| Compara. Example 4 | 130 | 105 | 25 | +1.23 | 86 | 65 |

TABLE 2

| | | Indentation Hardness | | |
|---|---|---|---|---|
| | Dropout (1 min) | Magnetic Layer (GPa) | Intermediate Layer (GPa) | Ratio* (%) |
| Example 1 | 6 | 1.72 | 1.30 | 76 |
| Example 2 | 10 | 0.90 | 0.72 | 80 |
| Example 3 | 12 | 0.33 | 0.65 | 197 |
| Example 4 | 8 | 1.32 | 1.02 | 77 |
| Comparative Example 1 | 53 | 1.55 | 0.85 | 55 |
| Comparative Example 2 | 75 | 0.32 | 1.27 | 396 |
| Comparative Example 3 | 38 | 0.42 | 1.10 | 262 |
| Comparative Example 4 | 121 | 0.29 | 0.42 | 145 |

*Ratio = (Indentation Hardness of Intermediate layer/ Indentation Hardness of Magnetic Layer) × 100

As is apparent from the results in Tables 1 and 2, the magnetic recording medium of the present invention (Examples 1 to 4) exhibits excellent output characteristics and has few dropouts.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording medium, comprising:

(i) a nonmagnetic substrate, (ii) an intermediate layer, on said nonmagnetic substrate, comprising a nonmagnetic powder, and (iii) a magnetic layer, on said intermediate layer, comprising a ferromagnetic powder and a binder, wherein said magnetic layer has an indentation hardness of 0.3 GPa or more, said magnetic layer has a 10 point height parameter $R_z$ of 100 nm or less, said magnetic layer has a difference between the maximum peak-to-valley distance PV and $R_z$ of 4 to 10 nm, and said magnetic layer has a skewness Rsk of −2 to less than 0.

2. The magnetic recording medium of claim 1, wherein said intermediate layer has an indentation hardness 50% to 200% of the indentation hardness of said magnetic layer.

3. The magnetic recording medium of claim 1, wherein said intermediate layer has an indentation hardness of 0.3 to 3.0 GPa.

4. The magnetic recording medium of claim 1, wherein said nonmagnetic powder of said intermediate layer is acicular and has a longer axis length of 0.02 to 0.3 µm and an acicular ratio of 3 to 20, said ferromagnetic powder in said magnetic layer is acicular and has a longer axis length of 0.05 to 0.25 µm and an acicular ratio of 3 to 20, and said magnetic recording medium is prepared by a process comprising:

forming said intermediate layer and said magnetic layer, followed by calendering said intermediate layer and said magnetic layer at a temperature of 80 to 200° C. and a linear pressure of 150 to 500 kgf/cm.

5. The magnetic recording medium of claim 1, wherein said magnetic recording medium is prepared by a process comprising:

polishing the magnetic layer under a tension load of 200 g/inch or more applied in the planar direction of said magnetic layer.

6. The magnetic recording medium of claim 1, wherein said magnetic recording medium is prepared by a process comprising:

forming said intermediate layer and said magnetic layer, followed by forming a backcoating layer on said nonmagnetic substrate, opposite said magnetic layer, and aging at a temperature of 50 to 90° C., a relative humidity of at most 15%, for at least 24 hours.

7. The magnetic recording medium of claim 1, wherein said magnetic layer has a thickness of 0.05 to 1 µm, and said intermediate layer has a thickness of 0.1 to 2.5 µm.

8. The magnetic recording medium of claim 4, wherein said process further comprises:

polishing said magnetic layer under a tension load of 200 g/inch or more applied in the planar direction of said magnetic layer.

9. The magnetic recording medium of claim 6, wherein said magnetic recording medium is prepared by a process comprising:

forming said intermediate layer and said magnetic layer, followed by calendering said intermediate layer and said magnetic layer at a temperature of 80 to 200° C. and a linear pressure of 150 to 500 kgf/cm, and forming said backcoating layer, polishing said magnetic layer under a tension load of 200 g/inch or more applied in the planar direction of said magnetic layer, and aging at a temperature of 50 to 90° C., a relative humidity of at most 15%, for at least 24 hours.

10. The magnetic recording medium of claim 3, wherein said nonmagnetic powder of said intermediate layer is acicular and has a longer axis length of 0.02 to 0.3 µm and an acicular ratio of 3 to 20, and said ferromagnetic powder in said magnetic layer is acicular and has a longer axis length of 0.05 to 0.25 µm and an acicular ratio of 3 to 20.

11. The magnetic recording medium of claim 10, wherein said magnetic recording medium is prepared by a process comprising:

forming said intermediate layer and said magnetic layer, followed by calendering said intermediate layer and said magnetic layer at a temperature of 80 to 200° C. and a linear pressure of 150 to 500 kgf/cm, and polishing the magnetic layer under a tension load of 200 g/inch or more applied in the planar direction of said magnetic layer.

12. The magnetic recording medium of claim 10, wherein said magnetic layer has a thickness of 0.05 to 1 µm, and said intermediate layer has a thickness of 0.1 to 2.5 µm.

13. A method of making the magnetic recording medium of claim 1, comprising:

coating said intermediate layer on said substrate; and coating said magnetic layer on said intermediate layer.

14. A method of making magnetic recording medium of claim 6, comprising:

coating said intermediate layer on said substrate;

coating said magnetic layer on said intermediate; and coating said backcoating layer on said substrate.

15. The method of claim 13, further comprising:

calendering said intermediate layer and said magnetic layer at a temperature of 80 to 200° C. and a linear pressure of 150 to 500 kgf/cm.

16. The method of claim 13, further comprising:

polishing said magnetic layer under a tension of load of 200 g/inch or more applied in the planar direction of said magnetic layer.

17. The method of claim 13, further comprising:

aging at a temperature of 50 to 90° C., a relative humidity of at most 15%, for at least 24 hours.

18. A method of making the magnetic recording medium of claim 6, comprising:

coating said intermediate layer on said substrate;

coating said magnetic layer on said intermediate layer;

coating said backcoating layer on said substrate; and aging at a temperature of 50 to 90° C., a relative humidity of at most 15%, for at least 24 hours.

* * * * *